United States Patent
Hill et al.

(10) Patent No.: US 8,761,450 B2
(45) Date of Patent: Jun. 24, 2014

(54) VISUAL OBJECT APPEARANCE MODELLING USING IMAGE PROCESSING

(75) Inventors: Andrew Hill, Skipton (GB); Christopher Brook Jackson, Bolton (GB)

(73) Assignee: 4Sight Imaging Limited, Bolton (GB)

( * ) Notice: Subject to any disclaimer, the term of this patent is extended or adjusted under 35 U.S.C. 154(b) by 259 days.

(21) Appl. No.: 13/059,991

(22) PCT Filed: Aug. 14, 2009

(86) PCT No.: PCT/GB2009/001985
§ 371 (c)(1), (2), (4) Date: Feb. 21, 2011

(87) PCT Pub. No.: WO2010/020758
PCT Pub. Date: Feb. 25, 2010

(65) Prior Publication Data
US 2011/0150325 A1    Jun. 23, 2011

(30) Foreign Application Priority Data
Aug. 21, 2008 (GB) .................................. 0815318.1

(51) Int. Cl.
*G06K 9/00* (2006.01)
*G06T 17/00* (2006.01)

(52) U.S. Cl.
USPC ............................ 382/107; 345/420; 717/104

(58) Field of Classification Search
USPC .......... 382/107, 149, 155, 181; 345/619, 644, 345/620; 700/29, 30, 31; 704/250, 255, 704/266; 717/104, 105, 125
See application file for complete search history.

(56) References Cited

U.S. PATENT DOCUMENTS

| | | | | |
|---|---|---|---|---|
| 5,365,596 | A * | 11/1994 | Dante et al. | 382/141 |
| 5,596,690 | A * | 1/1997 | Stone et al. | 345/630 |
| 7,038,680 | B2 * | 5/2006 | Pitkow | 345/440 |
| 7,657,102 | B2 * | 2/2010 | Jojic et al. | 382/224 |
| 7,774,344 | B2 * | 8/2010 | Horstmanshof et al. | 707/736 |
| 2005/0002562 | A1 | 1/2005 | Nakajima et al. | |

FOREIGN PATENT DOCUMENTS

WO    2004042539 A3    5/2004

OTHER PUBLICATIONS

Search Report for British Application No. 0815318.1, Dec. 18, 2008 (1 p.).
PCT/GB2009/001985 International Search Report, Jan. 4, 2010 (5 p.).
"Mahalanobis Distance," http://en.wikipedia.org/wiki/Mahalanobis_distance, Jul. 20, 2010 (3 p.).
"Eigendecomposition of a Matrix," http://en.wikipedia.org/wiki/Eigendecomposition_%28matrix%29, Jul. 15, 2008 (5 p.).

(Continued)

*Primary Examiner* — Abolfazl Tabatabai
(74) *Attorney, Agent, or Firm* — Conley Rose, P.C.

(57) ABSTRACT

A computer-implemented method of generating a model from a set of images. The method comprises processing a plurality of data items, each data item representing an image of said set of images, to determine variability between said plurality of data items; and generating model data representing said model based upon said data items and said variability, wherein the influence of each of said data items upon the generated model is determined by a relationship between a respective one of said data items and said variability.

33 Claims, 11 Drawing Sheets

(56) References Cited

OTHER PUBLICATIONS

Ruiz-Alzola, et al., "Nonrigid Registration of 3D Scalar, Vector and Tensor Medical Data," Feb. 11, 2004 (10 p.).

De La Torre, et al., "A Framework for Robust Subspace Learning," International Journal of Computer Vision 54 (1/2/3), pp. 117-142, 2003 (26 p.).

Cootes, et al., "Statistical Grey-Level Models for Object Location and Identification," Proc. British Machine Vision Conference, (Ed. D. Pycock) BMVA Press, pp. 533-542, 1995 (7 p.).

Cootes, et al., "Chapter 3. Modeling Facial Shape and Appearance," Imaging Science and Biomedical Engineering, University of Manchester, UK, pp. 39-63 (25 p.).

Nayer, et al., "Parametric Appearance Representation," Columbia University, pp. 131-160 (30 p.).

Wilcox, "Measures of Scale," p. 35 (1 p.).

\* cited by examiner

VISUAL OBJECT APPEARANCE MODELLING USING IMAGE PROCESSING

CROSS-REFERNCE TO RELATED APPLICICATIONS

This application is a 35 U.S.C. §371 national stage application of PCT/GB2009/001985 filed Aug. 14, 2009, which claims the benefit of British Application No. 0815318.1 filed Aug. 21, 2008, both of which are incorporated herein by reference in their entireties for all purposes.

STATEMENT REGARDING FEDERALLY SPONSORED RESEARCH OR DEVELOPMENT

Not applicable.

BACKGROUND

The present invention relates to methods and apparatus for processing images. More particularly, but not exclusively, the invention relates to a method for generating a model from a set of images, the model being useable to determine whether an input image is a member of the set of images. Some of the methods described herein also allow an area of input image best satisfying a model to be identified.

The use of computers in the field of image recognition is well known. One particular application of image recognition is in the field of industrial inspection. Here, a computer is provided with an image and it is required that output data indicating whether or not the input image is a member of a class of images is generated. The class of images may represent permissible variation of a particular component which is operated on by an industrial process.

It is known to carry out the processing described above using a model representing the class of images. Such models are typically created by receiving and processing a plurality of training images, the plurality of training images being examples of the class of images of interest. That is, given that many industrial processes have permissible ranges of variation, the plurality of training images will be examples which span the permissible range of variation, such that the generated model properly represents the permissible range of variation.

While the use of models of the type described above has enjoyed considerable success, it is not without its disadvantages. One disadvantage is that it is often difficult to generate a sufficiently accurate model, for example because a small number of the plurality of training images may erroneously not properly represent images which are within the permissible range of variation. The inclusion of such images in the model building process can result in models which wrongly indicate that input images are within the permissible range of variation when, in fact, this is not the case.

Another disadvantage of the use of models of the type set out above is that typically when an input image is provided which the model determines is not within the permissible range of variation, an operator is provided with no information of why this might be the case, simply an indication that the input image is not in accordance with the model.

Additionally, some existing techniques are such that when it is desired to identify an area of an input image which best satisfies a model, the techniques fail to even identify the area best satisfying the model, if that area insufficiently satisfies the model. That is, where no area of an input image sufficiently satisfies a model, it is often useful to provide information identifying the area which nevertheless best satisfies the model. Existing techniques often fail to do this.

It is an object of embodiments of the present invention to obviate or mitigate one or more of the problems set out above.

According to a first aspect of the present invention, there is provided a method of generating a model from a set of images. The method comprises processing a plurality of data items, each data item representing an image of said set of images, to determine variability between said plurality of data items. The model is generated based upon said data items and said variability wherein the influence of each of said data items upon the generated model is determined by a relationship between a respective one of said data items and said variability.

The invention therefore allows a model to be created in which the influence of a particular data item upon the created model is determined by relationship between the particular data item and the variability between the plurality of data items. Thus, a data item which is far outside the normal range of variability has a relatively low influence on the generated model. The created model is therefore considered to be a robust model, in that it is not affected to too great an extent by data items lying outside the normal range of variability used in its creation.

Each of the plurality of data items may be a normalized data item. Normalization of a data item can be carried out in any convenient way.

A plurality of initial data items may be received, each initial data item comprising a plurality of elements. A median value for each element may be computed based upon values of that element in each of said plurality of initial data items. The use of a median value in this way has been found to allow for robust normalization. More particularly, the use of a median value has advantages over the use of a mean value given that a median value is not unduly affected by a small number of outlying values.

A median absolute deviation (MAD) value for each element may be computed based upon values of that element in each of said plurality of initial data items. Again, the use of the MAD is advantageous given that it is relatively robust to outlying element values.

The method may further comprise processing each element of a respective data item with reference to a respective median value and MAD value to determine a normalization factor for the respective data item. A respective normalized data item for each initial data item can then be generated by applying said normalization factor to the respective initial data item. This method of normalization is advantageous given that its use of median and MAD values means that it is relatively robust to the effect of outlying data element values.

Generating the model based upon said data items may comprise associating a weight with each of said data items. The weights may be based upon said variability. The weights can be arranged such that influence of outlying data items is minimised. A weight for each of said data items may be computed.

Computing a weight for a respective data item may comprise determining a relationship between the respective data item and an average data item. The average data item may be a median data item. The use of a median data item is preferred as this results in the weights being computed in such a way that the effect of outlying data items is minimised.

The method may comprise determining a value indicating a confidence in each of said data items. The confidence of a respective data item may be based upon the relationship between the respective data item and the average data item and variability of said data items.

The method may further comprise generating a probability distribution from said values indicating a confidence in each of said data items, and determining a probability value for each of said data items based upon the generated distribution. The weight associated with a particular data item may be a function of the determined probability value. The function may provide a first weight value when said probability is within a first range, and the function may provide a weight value in a second range when said value indicating probability is in a third range.

Generating the model may comprise determining a difference relationship between each of said data items and an average data item to generate a plurality of difference data items. The average data item may be a weighted mean of said data items, the weighted mean being based upon the determined weights. The use of such a weighted mean is beneficial in providing the method with additional robustness.

The determined weights may be applied to said difference data items and a matrix indicating how each weighted difference data item varies with reference to each other weighted difference data item may be generated. The matrix may be a covariance matrix.

Generating the model may further comprise establishing the eigensystem of the said matrix to generate a plurality of eigenvectors and eigenvalues and creating a matrix containing at least some of said plurality of eigenvectors. In this way, principal component analysis is performed.

Generating said plurality of eigenvectors and eigenvalues may further comprise processing a further matrix, said further matrix being of smaller size than said matrix. More particularly, the eigenvalues may be derived from said further matrix.

The model may be a statistical model. For example, the model may have a form:

$$m + Pb$$

where m is an average data item;

P is a matrix indicating permissible variation; and b is an example instance of the model.

Each data item may be a vector, and each element of each data item may represent a pixel value.

According to a second aspect of the invention, there is provided, a method of generating data indicating how well an input image satisfies a model representing a set of images. The method comprises processing an input data item representing the input image to generate data indicating how well the image can be represented by the model. The input data item comprises a plurality of elements, each element representing a respective image element of the input image. Processing the input data item to determine how well the input image satisfies the model comprises determining an influence which each element of the input data item should have upon the generated data, and generating said data such that each element of the input data item has the determined influence.

The use of an influence in this way ensures that elements of the input data item which are anomalous have a relatively low influence upon the determination, thereby ensuring the robustness of the determination when some element values (e.g. pixel values) are anomalous.

Determining an influence which an element of the input data item should have upon the generated data may comprise generating a weight data item for each element of the input data item.

Generating said data such that each element has the determined influence may comprise determining a relationship between each element in a plurality of sample data items representing images of the set of images and a respective element of the input data item. A respective one of said weight data items may be applied to each relationship to generate said data indicating how well the input image satisfies the model.

Generating each weight data item may comprise determining a relationship between an element of the input data item and the variability of an element of a plurality of sample data items. The relationship between an element of the input data item and the variability of an element of a plurality of sample data items may be a relationship between the difference between the element of the input data item and an average element value, and said variability.

Each of said weight data items may be generated using iterative processing.

The method may further comprise generating output data indicating the influence of at least some of said input elements upon said determination. The output data may comprise graphical output data indicating pixels of the input image which contribute relatively little to the determination. In this way, diagnostic feedback can be provided to a user, for example using an appropriate graphical user interface.

The data indicating how well an input image satisfies a model may be generated iteratively.

The input data item may be a normalized input data item.

According to a third aspect of the present invention, there is provided, a method of identifying an area of an image which best satisfies a model. The method comprises processing a first area of said image with reference to the model, said processing generating displacement information. A second area of said image is processed with reference to the model, the second area being selected based upon said displacement information.

In this way, the third aspect of the invention generates data which can be used to focus and direct a search intended to locate an area of an image which best satisfies the model. This can be beneficial in improving the efficiency with which the area of an image best satisfying a model is located.

The displacement information may comprise translational displacement information and/or rotational displacement information.

Processing the first and/or second area of the image with reference to the model may comprise carrying out processing as described above in connection with the second aspect of the invention.

According to a fourth aspect of the present invention, there is provided, a method of generating model data representing a model of a class of images. The method comprises processing a plurality of sample data items to generate said model data, each sample data item comprising displacement information.

In this way, the fourth aspect of the invention generates a model which includes displacement information which can be useful when the model is applied to an input image.

The method may further comprise receiving an input data item and generating sample data items based upon a plurality of displaced versions of said input data item.

The processing may comprise performing principal component analysis.

It will be appreciated that the invention can be implemented in any convenient way. For example, aspects of the invention provide not only methods but also suitably configured apparatus. The invention may be carried out by means of suitable computer programs which may be carried out on appropriate carrier media. Such media includes both tangible carrier media and intangible carrier media. When the methods described above are implemented using a computer the various images and models may be represented by way of digital data which is stored in a suitable memory in the computer.

BRIEF DESCRIPTION OF THE DRAWINGS

Embodiments of various aspects of the present invention will now be described, by way of example only, with reference to the accompanying drawings, in which.

DEATAILED DESCRIPTION OF A PERFERRED EMBODIEMENT

Figure 1:
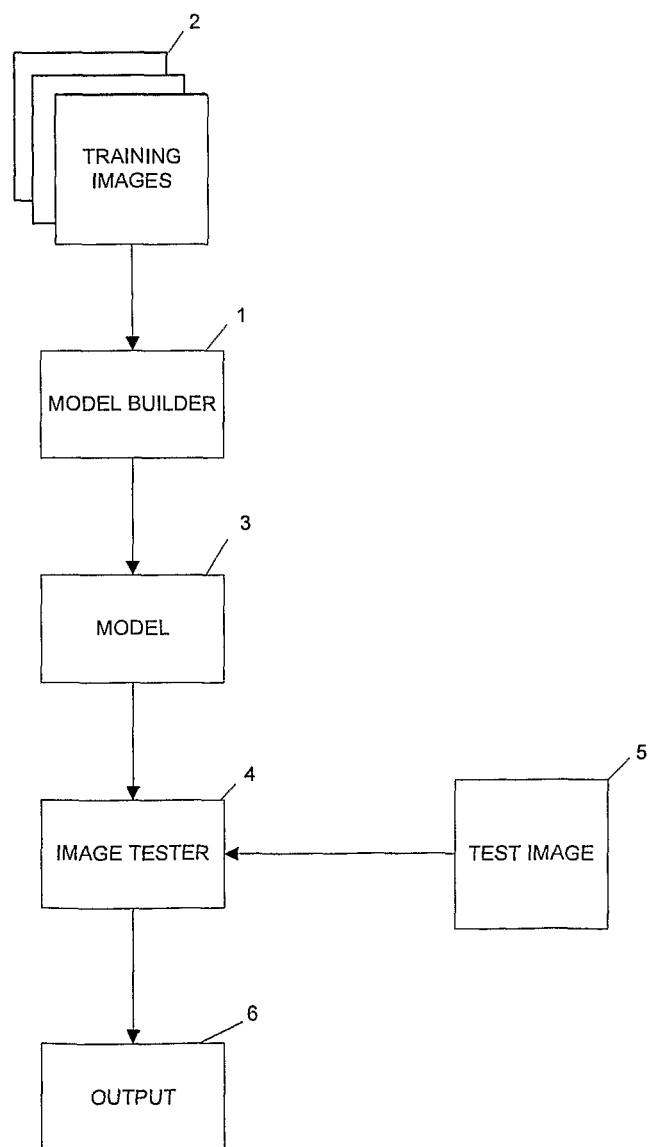
FIG. 1 is a schematic diagram of an image analysis system.

Referring now to FIG. 1, a model builder module 1 takes as input a set of training images 2. The model builder module 1 constructs a statistical model 3 based upon the training images 2 as described below with reference to FIG. 2. The model builder 1 outputs a statistical model 3 based upon the set of training images. The statistical model 3 is a model based upon the range of variation within the set of training images 2. The model 3 is passed to an image testing module 4 which processes a test image 5 with reference to the statistical model 3 to generate an output 6 indicating whether the test image 5 can be sufficiently accurately represented by the model.

The processing described with reference to FIG. 1 is such that if the set of training images 2 is representative of a particular class of images, the model 3 is a model representing that class of images. The image testing module 4 can then determine whether the test image 5 is a member of the class of images represented by the model 3 in the manner described above.

Figure 2:
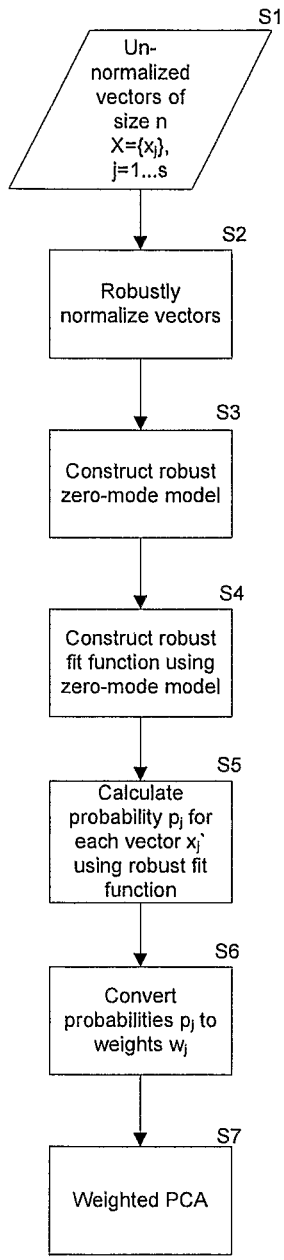
FIG. 2 is a flowchart showing processing carried out in constructing a robust statistical model of a set of sample vectors representing images.

Referring now to FIG. 2, the model builder module 1 of FIG. 1 receives at step S1 a sample set X which forms the set of training images 2. The set X contains s unnormalized sample vectors $x_j$ with j in the range 1 to s where each $x_j$ corresponds to a member of the set of training images 2 of FIG. 1. Each vector $x_j$ represents one of the training images 2 and each element of $x_j$ represents a pixel of the respective training image. Each vector $x_j$ is therefore of size n where n is the number of pixels contained in a training image. At step S2 the sample vectors $x_j$ are robustly normalized to give a normalized sample set X' containing a corresponding normalized sample vector $x_j'$ for each sample vector $x_j$ as described in further detail with reference to FIG. 3.

At step S3 a robust zero-mode model is constructed for the set X' and at step S4 a robust fit-function is constructed using the robust zero-mode model. The robust zero-mode model is so called because its creation does not depend upon an Eigensystem analysis, and as such the model contains no eigenvectors. An eigenvector can be said to represent a 'mode of variation' of the data from which it is derived. A model without eigenvectors is thus referred to as a 'zero-mode' model. At step S5 a probability estimate $p_j$ is calculated for each sample vector $x_j'$, using the robust fit-function calculated at step S4. At step S6 a weight $w_j$ for each sample vector $x_j'$ is calculated based upon the probability estimate $p_j$. The weights computed in this way are based upon a level of confidence associated with each vector $x_j'$, the level of confidence indicating whether each vector $x_j'$ is a valid member of the set of training images given the variation within the set of training images. The processing of steps S3 to S6 is described in further detail with reference to FIG. 4.

In this way, if the sample set X includes at least some vectors which are not properly representative of the class of images which the model is to represent, the methods described herein are configured such that vectors associated with training images which are not properly representative of the class of image have a relatively low impact on the created model. That is, where inaccuracies exist within the sample set X, those inaccuracies have a relatively low overall impact on the model. This results in the creation of a model which is said to be robust.

At step S7 weighted principal component analysis is carried out on the normalized sample set X' as described in further detail with reference to FIG. 5.

Figure 3:
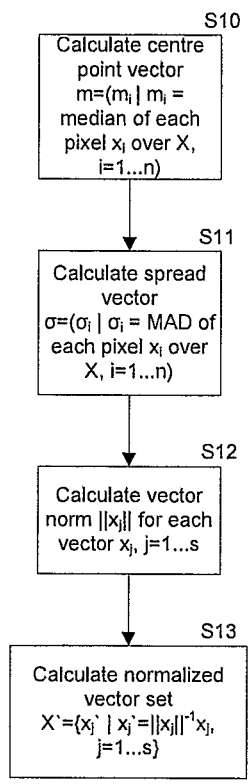
FIG. 3 is a flowchart showing processing for robustly normalizing a set of sample vectors in the process of FIG. 2.

The process of robustly normalizing the sample set X to calculate a normalized sample set X' is now described in further detail, with reference to FIG. 3 which shows processing carried out at step S2 of FIG. 2.

Referring to FIG. 3, at step S10 a centre point vector m is calculated for the set of sample vectors X. The centre point vector is a vector of size n where each element of m, $m_i$, is the median value of each pixel $x_i$ calculated across the sample set X. By using the median value the effect of outlier pixels in the input vectors is reduced or even eliminated. More specifically, while some known statistical models are based upon a centre point vector based upon a mean value of each pixel, such methods are undesirably affected by outlier pixels. This problem is overcome by the use of median values in the manner described above.

At step S11 a spread vector σ is calculated. The spread vector is a vector of size n where each element of σ, $\sigma_i$ is the median absolute deviation (MAD) of each pixel $x_{ji}$ across the sample set X. A MAD value $\sigma_i$ is calculated according to equation (1):

$$\sigma_i = \text{median}(|x_{ji} - m_i|, j=1 \ldots s) \quad (1)$$

Again, the use of the MAD as a measure of spread is effective in ensuring that outlying pixels do not unduly affect the created model. While this is a beneficial property of the use of the MAD value as described above, such benefits are not achieved where a measure such as standard deviation is used to indicate spread.

At step S12 the vector norm $\|x_j\|$ is calculated for each sample vector $x_j$ in X. The vector norm for a vector x is calculated according to equation (2) shown below.

$$\|x\| = \sum_{i=1}^{n} |m_i + W_{norm}(x_i - m_i, \sigma_i)(x_i - m_i)| \quad (2)$$

The function $W_{norm}$ is a Cauchy function calculated according to equation (3) shown below.

$$W_{norm}(x_i - m_i, \sigma_i) = \frac{1}{\left(1 + \left(\frac{x_i - m_i}{\beta \sigma_i}\right)^2\right)} \quad (3)$$

The parameter $\beta$ determines the penalty associated with bad data. The inventors have found a value of 3.5 for $\beta$ is effective. It will however be appreciated that other values of $\beta$ can be used in equation (3), and indeed that weight functions other than that of equation (3) can suitably be used.

At step S13 a normalized sample set X' of normalized vectors $x_j'$ is calculated by applying the vector norm $\|x_j\|$ calculated at step S12 to each sample vector $x_j$ according to equation (4) shown below.

$$x_j' = \|x_j\|^{-1} x_j, j=1 \ldots s \quad (4)$$

From the preceding discussion it will be appreciated that normalizing the input vectors using the median and MAD values across the sample set X reduces the effect of outlier pixels or bad pixels. The normalization process described above ensures the model is resilient when bad examples are included in the sample set. Good discrimination is still possible when the sample set X includes vectors representing some training images which are not properly representative of the class of images represented by the sample set.

The process of calculating a set W of weights $w_j$ where each $w_j$ corresponds to a normalized sample vector $x_j'$ is now described in further detail with reference to FIG. 4 which shows processing carried out at steps S3 to S6 of FIG. 2.

Figure 4:
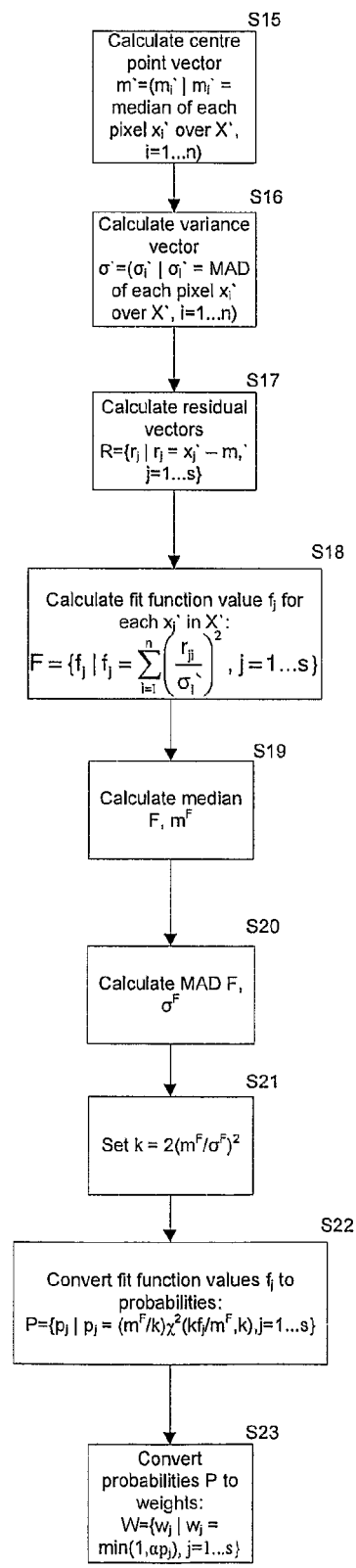
FIG. 4 is a flowchart showing part of the processing of FIG. 2 arranged to generate weights for the set of sample vectors.

Referring to FIG. 4, at step S15 a centre point vector m' of size n is calculated from the set of normalized sample vectors X', each element of the centre point vector m' is the median value of that element across the set of normalised sample vectors x'. At step S16 a spread vector $\sigma'$ of size n is calculated for the set X'. The spread vector $\sigma'$ comprises a MAD value for each pixel. It will be appreciated that the centre point vector m' and spread vector $\sigma'$ are calculated in the same way as at steps S10 and S11 of FIG. 3 and as described previously, but are now based upon the set X' rather than the set X.

At step S17 a set R of residual vectors $r_j$ is calculated, each vector $r_j$ is of size n, with one residual vector calculated for each member of the normalized training set X'. Each residual vector $r_j$ is calculated according to equation (5) shown below.

$$r_j = x_j' - m', j=1 \ldots s \quad (5)$$

At step S18 a set F of quality of fit function values $f_j$ is calculated, where each $f_j$ corresponds to a member of the normalized training set $x_j'$. Each quality of fit function value is calculated according to equation (6) shown below:

$$f_j = \sum_{i=1}^{n} \left(\frac{r_{ji}}{\sigma_i'}\right)^2, j=1 \ldots s \quad (6)$$

where $r_{ji}$ is the $i^{th}$ element of the residual vector $r_j$ associated with the sample vector $x_j'$, and $\sigma_i'$ is the $i^{th}$ element of the spread vector $\sigma'$ calculated at step S16.

The value $f_j$ is an indication of how likely it is that a vector $x_j'$ represents a valid example of the class of images represented by the training images, given the range of variation within the set of training images. A smaller value of $f_j$ indicates that a vector $x_j'$ is more likely to be a valid example, with a value of $f_j=0$ occurring when $x_j'=m'$.

At step S19 the median, $m^F$ of the set F is calculated and at step S20 the MAD, $\sigma^F$ of the set F is calculated. At step S21 a value k is calculated according to equation (8) for ease of further calculations:

$$k = 2(m^F/\sigma^F)^2 \quad (8)$$

At step S22 a set P of probabilities $p_j$ is calculated where each probability $p_j$ based upon the fit function values $f_j$ of the set F. The method assumes that the fit function values $f_j$ form a $\chi^2$ distribution. Using the assumption of a $\chi^2$ distribution and the median and MAD of the values $f_j$ in the set F, values $p_j$ are calculated using a standard algorithm given by equation (9) below.

$$p_j = (m^F/k)\chi^2(kf_j/m^F, k), j=1 \ldots s \quad (9)$$

At step S23, for each probability $p_j$ in the set P a weight $w_j$ is calculated according to equation (10) given below:

$$w_j = \min(1, \alpha p_j) \quad (10)$$

where $\alpha=10$ and the function min returns the smallest value of its arguments. It can be seen that the weight $w_j$ takes the value 1 for any probability value $p_j$ greater than the threshold 0.1. Probability values of $p_j$ less than 0.1 have a diminishing contribution proportional to their scaled probability.

Referring back to FIG. 2, the process of calculating weights $w_j$ at step S6 has been described. At step S7 of FIG. 2 the weights $w_j$ are processed together with the normalized vectors $x_j'$, to derive a weighted covariance matrix C and an eigensystem analysis is performed upon this weighted covariance matrix C.

The process of performing an eigensystem analysis of a weighted sample covariance matrix generated from the set of sample vectors X' is now described in further detail with reference to FIG. 5 which shows processing carried out at step S7 of FIG. 2.

Figure 5:
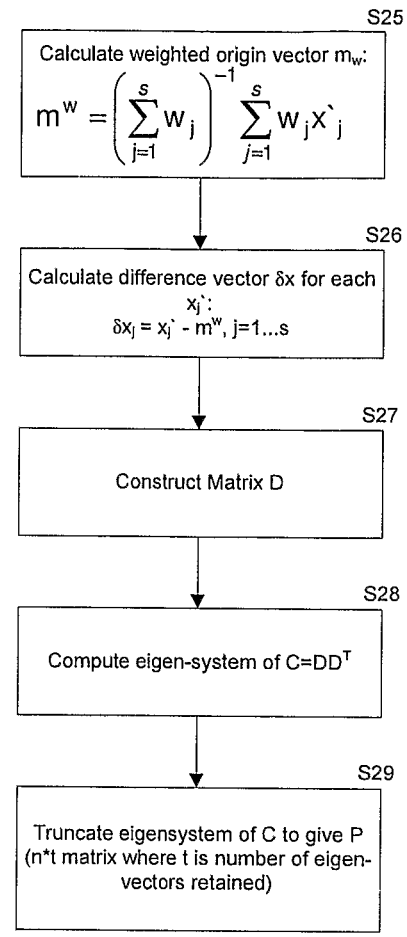
FIG. 5 is a flowchart showing processing to perform weighted principal component analysis in the processing of FIG. 2.

Referring to FIG. 5, at step S25 the weighted origin vector $m^w$ is calculated according to equation (11) given below:

$$m^w = \left(\sum_{j=1}^{s} w_j\right)^{-1} \sum_{j=1}^{s} w_j x_j' \quad (11)$$

where the value $w_j$ is the weight associated with the sample vector $x_j'$ and calculated at step S6 of FIG. 2 with reference to FIG. 4.

At step S26 a difference vector $\delta x_j$ is calculated for each sample vector $x_j'$ according to equation (12):

$$\delta x_j = x_j' - m^w, j=1 \ldots s \quad (12)$$

It is desired to determine a covariance matrix C based upon the difference vectors given by equation (12). The covariance matrix is defined by equation (13):

$$C = \left(\sum_{j=1}^{s} w_j\right)^{-1} \sum_{i=1}^{s} w_j (\delta x_j \delta x_j^T) \quad (13)$$

The matrix C can be created using equation (14):

$$C = DD^T \quad (14)$$

where D is an (n×s) weighted data matrix defined by equation (15):

$$D = \left(\sqrt{\frac{w_j}{\sum_{i=1}^{s} w_i}}\right)\delta x_j, \ j = 1, \ldots, s \quad (15)$$

where j is a column of D.

At step S27, the matrix D is constructed according to equation (15), and at step S28 the eigensystem of the covariance matrix C defined by equation (14) is calculated. The created eigensystem is truncated at step S29 to give a matrix P where P is an (n×t) matrix and t is the number of eigenvectors retained in P.

Where the value n of the number of elements in each sample vector is less than or equal to the value s of sample vectors, the matrix $C=DD^T$ is explicitly constructed and its eigensystem determined at step S28. Any known method for calculating eigenvectors and eigenvalues may be used. However, it is often the case that the value s indicating the number of sample vectors is smaller than the value n indicating the number of pixels in each sample vector. Where this is the case the calculation at step S28 may be performed according to the computationally less expensive processing described below with reference to FIG. 6 in which the eigensystem of $C=DD^T$ is established via the eigensystem of the smaller matrix $D^TD$.

Figure 6:
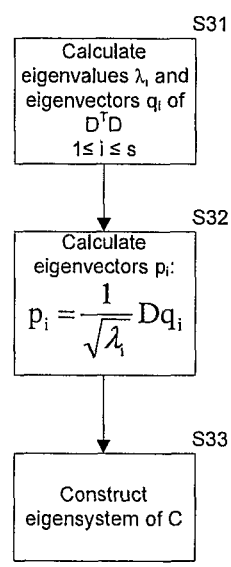
FIG. 6 is a flowchart showing part of the processing of FIG. 5 arranged to calculate an eigensystem of a matrix.

Referring to FIG. 6, At step S31 the eigenvalues $\lambda_i$ and orthonormal eigenvectors $q_i$ of the (s×s) matrix $D^TD$ are calculated. Any known method for calculating eigenvectors and eigenvalues may be used.

It can be shown that the eigenvalues $\lambda_i$ of the matrix $D^TD$ are also the eigenvalues of the matrix $DD^T$ as set out below. By definition:

$$(D^TD)q_i = \lambda_i q_i \quad (16)$$

Multiplying both sides of equation (16) by D gives:

$$(DD^T)(Dq_i) = \lambda_i(Dq_i) \quad (17)$$

From equations (16) and (17) it can be seen that $Dq_i$ are eigenvectors of the matrix $DD^T$ and the eigenvalues $\lambda_i$ are common to both the matrices $DD^T$ and $D^TD$. In order to maintain the orthonormality of the eigenvectors of $DD^T$, $p_i$, the $Dq_i$ vectors are scaled as follows at step S33:

$$p_i = \frac{1}{\sqrt{\lambda_i}} Dq_i \quad (18)$$

Orthonormality of the eigenvectors $p_i$ is ensured as follows:

$$p_i^T p_j = \left(\frac{1}{\sqrt{\lambda_i}} Dq_i\right)^T \left(\frac{1}{\sqrt{\lambda_j}} Dq_j\right) \quad (19)$$

$$= \frac{1}{\sqrt{\lambda_i \lambda_j}} (Dq_i)^T (Dq_j)$$

$$= \frac{1}{\sqrt{\lambda_i \lambda_j}} q_i^T (D^T D q_j)$$

$$= \frac{1}{\sqrt{\lambda_i \lambda_j}} q_i^T (\lambda_j q_j) \text{ from equation (16)}$$

$$= \sqrt{\frac{\lambda_j}{\lambda_i}} q_i^T q_j = \begin{cases} 0 (i \neq j) \\ 1 (i = j) \end{cases}$$

It can therefore be seen that the eigensystem of the smaller (s×s) matrix $D^TD$ (where s<n) is used at step S33 to establish the eigensystem of the (n×n) matrix $DD^T$. It can be computationally less expensive to calculate the eigensystem of the matrix $D^TD$ in the case where s is smaller than n and significantly so in the case where s is much smaller than n.

Each eigenvalue of C is indicative of the variance of the training examples from the weighted mean associated with the corresponding eigenvector. The eigenvalues and corresponding eigenvectors are ordered in decreasing magnitude of the eigenvalues. As described with reference to FIG. 5, at step S29 the eigenmatrix is truncated to give the (n×t) matrix P where n is the number of elements in each input vector and t is the number of eigenvectors retained.

The number of eigenvectors retained is determined by choosing the eigenvectors corresponding to the largest eigenvalues which sum to a predetermined proportion of the total variance, the total variance being the sum of all the eigenvalues. For example, given 10 eigenvectors with corresponding eigenvalues (0.4, 0.3, 0.2, 0.05, 0.02, 0.01, 0.006, 0.005, 0.005, 0.004) and predetermined proportion of variance chosen to be 0.95, the first 4 eigenvectors are retained, since the first 4 eigenvalues, corresponding to the retained eigenvectors, sum to 0.95 and the total variance is 1.0.

The matrix P forms part of the statistical model 3 of FIG. 1 and is passed to the image testing module 4 for testing of further input images 5. An input image 5 is represented by a candidate vector y. The image testing module 4 is arranged to determine whether it is possible to find a vector b representing a point in the space defined by the truncated eigensystem such that equation (20) is satisfied:

$$y = m^w + Pb \quad (20)$$

where $m^w$ is the weighted origin vector of the model, P is the truncated eigenmatrix and b is the unknown vector which represents a point in the space defined by the truncated eigensystem.

It will be appreciated that it will often not be possible to find a vector b such that equation (20) is exactly satisfied, thus, it is necessary to determine whether an error given by equation (21) is sufficiently small so that it can be considered that the candidate vector y representing the input image 5 is an example of the class of images defined by the model.

The reconstruction error yr for a given candidate vector y is given by equation (21):

$$yr = y - (m^w + Pb) \quad (21)$$

The problem to be solved with respect to b is given by equation (22):

$$\text{Min}(yr^T W yr) \quad (22)$$

where W is a (n×n) diagonal matrix of positive weights where the weights reflect the confidence in each element of y. That is, without applying the diagonal matrix of positive weights W to the elements of the vector yr each element is given an equal rating such that a single anomalous element can have a disproportionate effect upon the processing. Equation (22) can be written as equation (23):

$$\text{Min}(yr^T Wyr) = \text{Min}(yr^T \sqrt{W} \sqrt{W} \, yr) \quad (23)$$
$$= \text{Min}((\sqrt{W} \, (y - (m^w + Pb))^T$$
$$(\sqrt{W} \, (y - (m^w + Pb)))$$
$$= \text{Min}\|\sqrt{W} \, (y - (m^w + Pb))\|^2$$
$$= \text{Min}\|\sqrt{W} \, ((y - m^w) - Pb)\|^2$$

Using the well known result given by equation (24):

$$\text{Min}\|a - Bz\|^2 \text{ with respect to } z \text{ has the solution } (B^T B)$$
$$z = B^T a \quad (24)$$

the solution to equation (23) is therefore given by equation (25):

$$(\sqrt{W}P)^T(\sqrt{W}P)b = (\sqrt{W}P)^T \sqrt{W}(y - m^w) \quad (25)$$

which can be simplified to give equation (26):

$$(P^T W P)b = P^T W(y - m^w) \quad (26)$$

While the solution of equation (26) is mathematically straightforward, the straightforward solution is computationally expensive. Equation (26) is therefore solved as follows in the image testing module 4, to determine the value b providing the minimum value of yr in a computationally less expensive way. This will now be described with reference to FIG. 7.

Figure 7:
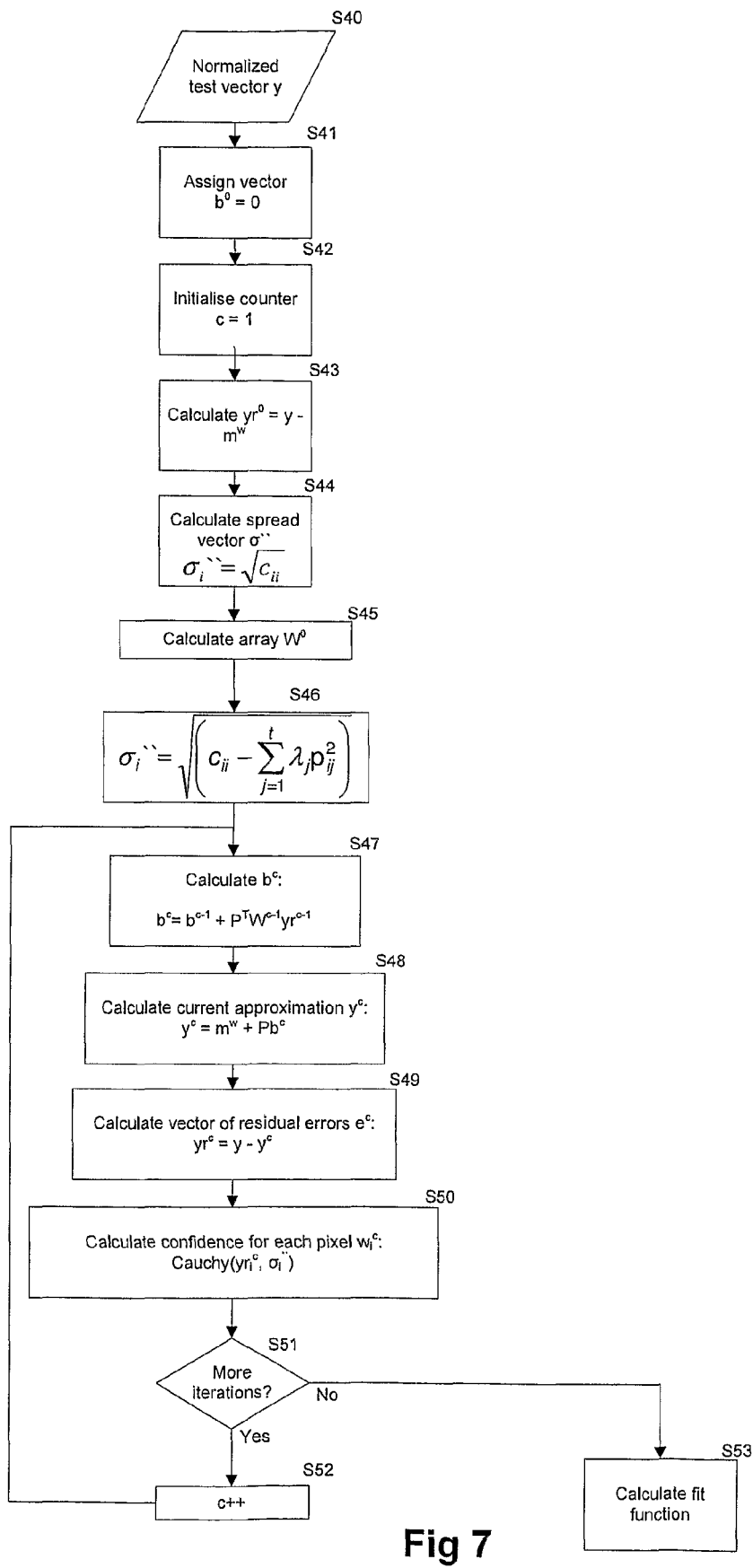
FIG. 7 is a flowchart showing processing carried out to test a test vector's fit to the robust statistical model generated using the processing of FIG. 2.

Referring to FIG. 7, at step S40 a test vector y, normalized according to the processing of FIG. 3 and corresponding to the input image 5 of FIG. 1 is input to the image testing module 4 of FIG. 1. The test vector y represents the input image 5 and has the same size as each of the training images 2 of FIG. 1, and each element of y corresponds to a pixel of each training image.

At step S41 a vector $b^0$ of size t is initialised to have all elements equal to 0. At step S42 a counter variable c is initialised to 1. The counter variable c indicates the current iteration of the processing defined by steps S46 to S51. At step S43 the initial error vector $yr^0$ of size n is calculated by point-wise subtracting the elements of the weighted origin vector $m^w$, calculated at step S25 of FIG. 5, from the corresponding elements of the test vector y as shown by equation (27) below:

$$yr_j^0 = y_j - m_j^w, \, i = 1 \ldots n \quad (27)$$

At step S44 the spread vector σ" of size n is calculated by equation (28) below:

$$\sigma_i'' = \sqrt{c_{ii}}, \, i = 1 \ldots n \quad (28)$$

where $c_{ii}$ is the $i^{th}$ diagonal element of the covariance matrix C. The value $c_{ii}$ is the total weighted variance associated with the $i^{th}$ pixel over the training set. At step S45 the (n×n) diagonal matrix of weights $W^0$ is calculated. The matrix $W^0$ has values on the diagonal defined by equation (29) below:

$$W_{j,j}^0 = \text{Cauchy}(yr_j^0, \sigma_i'') = \frac{1}{\left(1 + \left(\frac{yr_j^0}{\beta\sigma_i''}\right)^2\right)} \quad (29)$$

and all other values of $W^0$ equal to 0. Each value $W_{j,i}$ indicates a confidence in the $i^{th}$ pixel of y. The parameter β determines the penalty associated with bad data. The inventors have found a value of 5.5 for β is effective in equation (29). It will however be appreciated that other values of β can be used, and indeed that other weighting functions can be used.

For the purposes of the processing described below, at step S46 the vector σ" is redefined according to equation (30):

$$\sigma_i'' = \sqrt{\left(c_{ii} - \sum_{j=1}^{t} \lambda_j p_{ij}^2\right)}, \, i = 1 \ldots n \quad (30)$$

where $p_{ij}$ is the $i,j^{th}$ element of the matrix P calculated at step S29 of FIG. 5.

At step S47 the $c^{th}$ iteration of the vector b, $b^c$ is calculated according to equation (31) below:

$$b^c = b^{c-1} + P^T W^{c-1} yr^{c-1} \quad (31)$$

where $P^T$ is the transpose of the matrix P calculated at step S29 of FIG. 5. At step S48 the current approximation of the vector y, $y^c$ is calculated according to equation (32) below:

$$y^c = m^w + P b^c \quad (32)$$

At step S49 the $c^{th}$ iteration of the error vector is calculated according to equation (33) below:

$$yr^c = y - y^c \quad (33)$$

At step S50 the $c^{th}$ iteration of the matrix W is calculated according to equation (34) below:

$$W_{j,i}^c = \text{Cauchy}(yr_i^c, \sigma_i''), \, i = 1 \ldots n \quad (34)$$

where the function Cauchy is as defined by equation (29).

At step S51 a check is carried out to determine whether further iterations of the processing of steps S47 to S50 should be carried out. In one embodiment a small predetermined number of iterations is carried out, for example a number in the range 1 to 10, such as 2 or 3. If further iterations are to be carried out, processing passes from step S51 to step S52 where the value of c indicating the current iteration is incremented, before processing returns to step S47. If the predetermined number of iterations has been carried out, processing passes from step S51 to step S53 where the quality of fit of the vector $b^c$ is determined. The quality of fit is calculated according to either equation (35) or (36) below:

$$f' = e^{\left(\frac{1}{w} - 1\right)} \left( \frac{M_t}{n} + \left(\frac{1}{\sum_{i=1}^{n} w_i}\right) \sum_{j=1}^{n} w_j \frac{yr_j^2}{v_j} \right) \quad (35)$$

$$f = M_t + \sum_{j=1}^{n} \frac{yr_j^2}{v_j} \quad (36)$$

where $$\overline{w} = \frac{1}{n} \sum_{i=1}^{n} w_i,$$

$w_i = W_{i,i}$, $yr = yr^c$, $v_j = (\sigma_j'')^2$, the vector σ" is as defined at step S46 of FIG. 7 and $M_t$ is the Mahalanobis distance. The Mahalanobis distance is a normalized distance metric measuring the distance from the origin of the model (i.e. the centre point vector) in the dimensions spanned by the model. $M_t$ is calculated by equation (37):

$$M_t = \sum_{i=1}^{t} \frac{b_i^2}{\lambda_i} \quad (37)$$

where t is the number of eigenvectors and eigenvalues retained from the eigensystem analysis, $\lambda_i$ is the $i^{th}$ eigenvalue and $b_i$ is the $i^{th}$ element of the vector $b^c$. The lower the value of either of the fit functions $f$, $f'$ the better the fit of the test vector y to the model, with a value of 0 occurring when $y=m^w$.

It can be seen that when the weights are each unity, $f'$ can be expressed according to equation (38) below:

$$f' = \frac{M_t}{n} + \frac{1}{n}\sum_{j=}^{n} \frac{yr_j^2}{v_j} = \frac{f}{n} \quad (38)$$

The function $f'$ weights defective pixels and therefore allows non-defective pixels to be correctly assessed. Each pixel is weighted according to the weights $w_i$ calculated for each pixel of the candidate vector y by the process described with reference to FIG. 7.

A vector $w_y$ of size n is output where $w_y$ is calculated according to equation (39) below:

$$w_{y,i} = W_{i,i}, i=1 \ldots n \quad (39)$$

The processing described above is concerned with determining how well the image represented by the normalized test vector y satisfies the created model. In many practical applications, the test vector y represents part of a larger input image. It cannot be known in advance exactly where within the larger input image the object of interest lies.

It is desired to determine an area within the larger input image which best satisfies the created model. It can subsequently be determined whether the determined area satisfies the model sufficiently well for it to be concluded that the determined area is indeed an instance of the class of images represented by the model. The quality of fit function defined by equation (35) can be used to differentiate between alternative areas of a large image to determine an area which best satisfies the model, while the quality of fit function defined by equation (36) can be used to evaluate the area best satisfying the model discovered during such an image search to determine whether the area best satisfying the model satisfies the model sufficiently well for the area to be considered to represent the class of images represented by the model.

In order to locate the area of the input image which best satisfies the created model, the processing described with reference to FIG. 7 is carried out repeatedly for different areas of the input image, each area being represented by a respective test vector which is input to the processing of FIG. 7. For each test vector a value of the fit function $f'$ defined by equation (35) can be calculated. The area of the image providing the best (i.e. minimum) value of the fit function $f'$ can be determined to be the area of the input image which is most likely to represent an instance of the model sufficiently well.

The processing described above can be carried out by considering the input image as a search grid, which can conveniently be defined by the pixels within the input image. A respective test vector is created from each area of the input image defined by the search grid, and each test vector is input to the process of FIG. 7 to generate a value of the fit function $f'$. Each test vector represents an area of the input image defined by a particular position on the search grid and an orientation. While this processing can be effective in determining an area of the input image (defined by position and orientation) which best represents an instance of the model, it will be appreciated that it is computationally expensive, given that the processing of FIG. 7, and computation of a value of the fit function $f'$ must be repeated for each area of the input image defined by the search grid.

In order to reduce the computational cost of the search process, an initial search of the input image may be carried out using a more coarsely defined grid. This initial search can thereby provide an estimate of the area of the image which represents the best instance of the model in the input image. When an area of the image has been identified in this way, the determined area can be refined by performing further searches of the identified area at a higher-resolution (i.e. using a more finely defined grid). A typical search method based upon such a technique may start a search using data subsampled by a factor of 64 and identify an area of the image based upon this sub-sampled data. Subsequent search processing then reduces the sub-sampling (by a factor of 4 at each stage) and continues until the search has been carried out at the highest possible resolution. It will be appreciated that a technique of this type using varying resolutions (sometimes referred to as a "pyramid search") can considerably reduce computational complexity, given that while an entire input image is processed at a coarse resolution, the finest resolution is used only to search a relatively small part of the input image. Each stage of a pyramid search technique is carried out using a model having the appropriate resolution. That is, a search based upon the relatively coarse grid is carried out using a relatively low resolution model, while a search based upon a finer grid is carried out using a higher resolution model. However, even when such a pyramid search technique is used, the methods described herein still take considerable time to execute given their inherent computational complexity.

Additionally, it is sometimes desired to not limit a search to a pixel-based grid, but instead to search at sub-pixel resolution. That is higher resolution data is generated from the input image using interpolation, and the higher resolution data can be searched at resolutions of, for example, +/−0.5 pixels in each of x and y directions. Searching at sub-pixel resolution can effectively be carried out using local optimisation techniques, in which the direction of search is determined by the results of previous evaluations of the fit function $f'$, based upon an assumption that the fit-function values provide a single minima within the search area (i.e. an assumption that the fit function values are quadratic). While searching at sub-pixel resolution provides improved results, it will be appreciated that such searching exacerbates problems of computational complexity.

From the preceding description of search techniques, it will be appreciated that although the search techniques described above can be used to identify an area of an input image which best satisfies a model, the processing is undesirably computationally complex.

To overcome the problems outlined above, the processing which is now described can be carried out.

Figure 8:
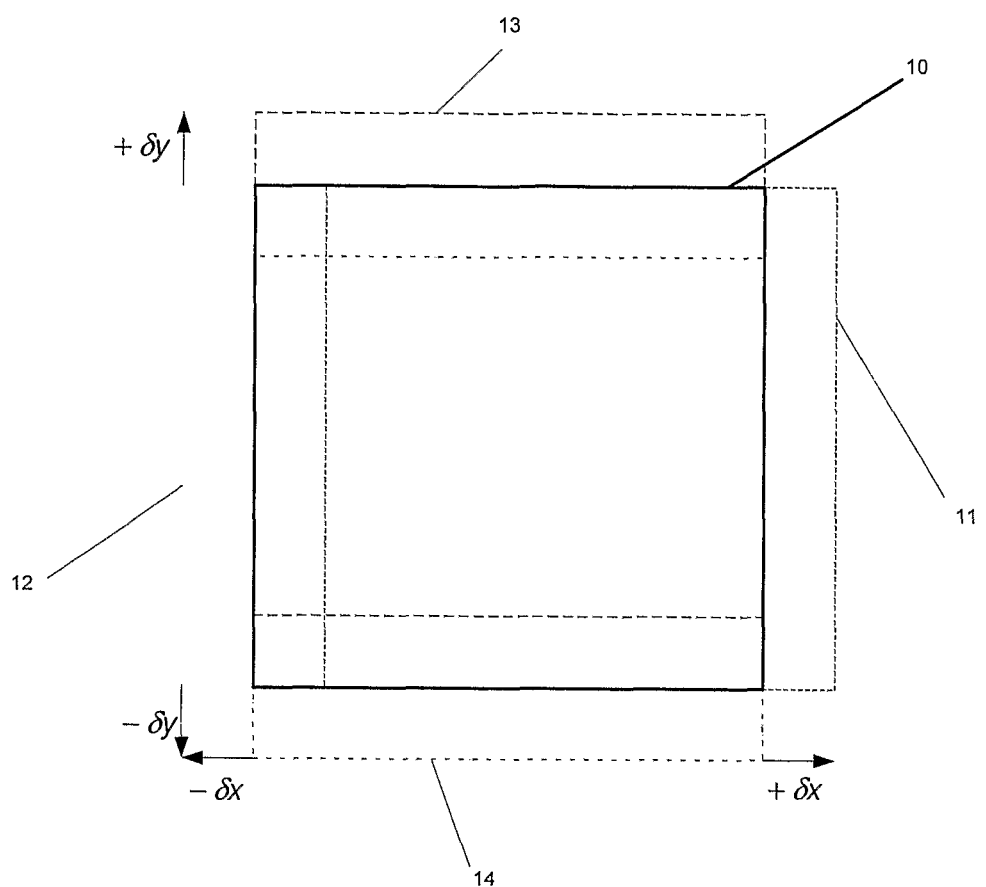
FIG. 8 is a schematic illustration showing displacements of a training example.

FIG. 8 shows a rectangle 10 which indicates an example used to generate the model. FIG. 8 also shows a rectangle 11 which indicates the example represented by the rectangle 10 displaced by a displacement δx. A rectangle 12 indicates the example represented by the rectangle 10 displaced by a displacement of −δx. Similarly a rectangle 13 indicates the example represented by the rectangle 10 displaced by a displacement of δy, while a rectangle 14 indicates the example represented by the rectangle 10 displaced by a displacement of $-\delta y$. It will be appreciated that the example represented by the rectangle 10 could also be displaced by angles $\delta\theta$ and $-\delta\theta$.

By building a model based not only upon input examples but also upon displaced versions of each input example (as represented by the rectangles 11, 12, 13, 14), the processing described above can be applied to a test vector and used to direct a search process, as described below.

Figure 9:
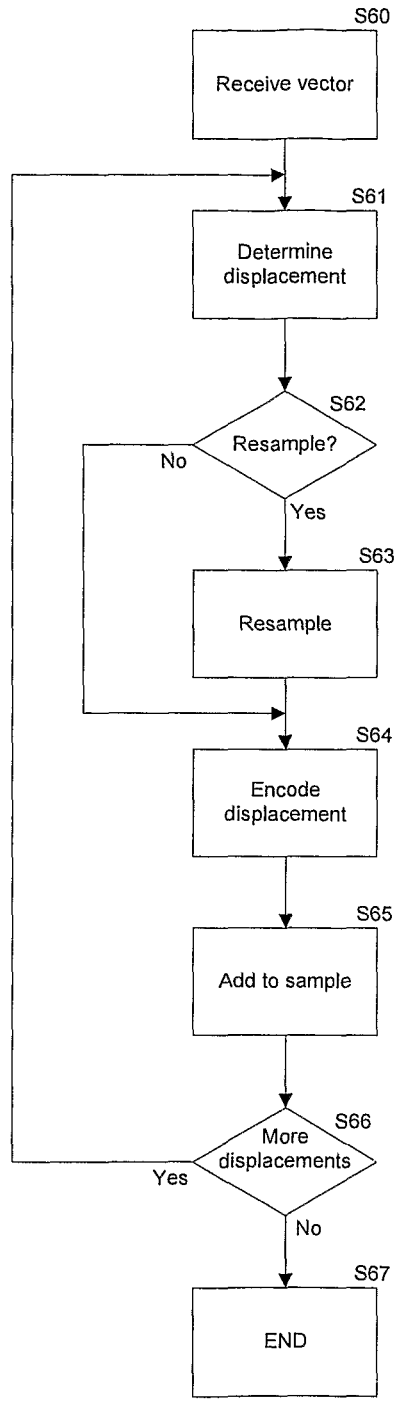
FIG. 9 is a flowchart showing how displaced training examples can be used to create a sample set suitable for use in the processing of FIG. 2.

FIG. 9 is a flow chart showing processing carried out to create displaced versions of each input vector representing a training image.

At step S60 an input vector is received. The processing of steps S61 to S66 (described below) is then repeated seven times so as to create seven sample vectors for inclusion in the sample set X. Each input vector is displaced in a plurality of predetermined ways, specifically $+/-\delta x$, $+/-\delta y$, and $+/-\delta\theta$. $\delta x$, $\delta y$, and $\delta\theta$ can take any suitable values. In one embodiment $\delta x$ and $\delta y$ take values of $+/-0.5$ pixels, while $\delta\theta$ takes values of $+/-0.5°$. Each pass of steps S61 to S66 creates a sample vector based either upon an un-displaced version of the input vector, or upon one of the six displaced versions of the input vector each using one of the indicated displacements.

At step S61 a displacement to be applied to the input vector is determined. At step S62 a check is carried out to determine whether the training image should be re-sampled, which will be required unless step S61 determines that no displacement is required. If re-sampling is required, processing passes to step S63 where re-sampling is carried out, before processing continues at step S64. If no re-sampling is required, processing passes directly from step S62 to step S64.

At step S64 the displacement determined at step S61 is encoded within the created sample vector. More particularly the pixel values making up the sample vector are augmented by three elements respectively representing $\delta x$, $\delta y$, and $\delta\theta$. The sample vector to which the displacement has been added is then added to the sample set X at step S65.

Processing passes from step S65 to step S66 where a check is carried out to determine whether displacements of the input vector remain to be processed. If this is the case, processing passes from step S66 to step S61. Otherwise, processing ends at step S67.

The processing described above provides an enlarged sample set X which can be input to the processing described above with reference to FIG. 2. The pixel values of the sample vectors of the input vectors are normalized in the manner described above with reference to FIG. 3. Additionally, the additional elements of the vectors indicating displacement are also normalized such that the variance associated with each displacement value ($\delta x$, $\delta y$, and $\delta\theta$) is similar to the variance associated with each of the pixels of the vector. This is achieved by multiplying each displacement value by an appropriate scaling factor. At step 16 of FIG. 4, the pixel spread vector $\sigma'$ is calculated over the set of normalised training vectors. The median of these values is given by:

$$\sigma^M = \text{median}(\sigma_j'), i=1\ldots n \qquad (40)$$

The scale factors to be applied to the non-pixel elements are then given by:

$$\alpha_x = \sigma^M/\partial x;$$

$$\alpha_y = \sigma^M/\partial y; \text{ and}$$

$$\alpha_\theta = \sigma^M/\partial\theta \qquad (41)$$

Having created a sample set in the manner described above, a model can be created using the processing of FIG. 2. The model will now encode not only visual appearance, but also displacement. More specifically, when a test vector is processed to produce a point in model space b representing the test vector, the model's reconstruction of the test vector, ($m^w$+ Pb), will include elements indicating displacement. The displacement elements are extracted from the vector and then scaled appropriately by the inverse of the scale factors defined by equation (41) used to normalise the displacement elements, i.e. by ($\alpha_x^{-1}, \alpha_y^{-1}$, and $\alpha_\theta^{-1}$), in order to convert the values encoded on the vector back into pixel/angular displacements. Once the displacement values have been extracted, they can be used to direct the search. More specifically the next position within an input image for which a test vector is created is determined by the displacement information extracted from the vector ($m^w$+Pb), thus allowing the search to be more effectively focussed, and thus reducing overall computational complexity.

It will be appreciated that the processing described with reference to FIGS. 8 and 9 is limited to directing the search by the size of the displacements used in creation of the sample set X. Therefore, in some embodiments, a pyramid search technique may be used in which an approximate area is determined using a coarse resolution search. Finer resolution searches can then use the directed search technique described above with reference to FIGS. 8 and 9. The resolution at which the directed search technique can provide useful information is determined by the magnitude of the displacements used in creation of the sample set X. It will be appreciated that the magnitudes of the displacements used can be determined by the application to which the technique is to be applied. Additionally, in some embodiments, each input image may be subject to a plurality of displacements of the same direction but different magnitudes.

It has been described above that repeated application of the processing of FIG. 7 to a plurality of test vectors can allow an area of an input image which best satisfies a model to be determined, with reference to the value of the fit function $f'$. Having determined a test vector providing the best value of the fit function $f'$, a value of the fit function $f$ defined by equation (36) for that test vector is computed. The resulting value of $f$ can then be converted into a probability using the following approach:

After the model 3 has been built as described with reference to FIG. 1, the model fitting process with reference to FIG. 7 is applied to each normalised training vector $x'_j$, $j=1\ldots s$. The corresponding set of vectors $b_j$, $j=1\ldots s$ so produced are evaluated using equation (36) to produce a set of quality of fit function values, $F=\{f_j, j=1\ldots s\}$, corresponding to the set of normalised training vectors. The median, $m^F$, and MAD, $\sigma^F$, of the set F are computed and recorded. Using the assumption of a $\chi^2$ distribution for the function $f$, any particular value of the function $f$ defined by equation (36) can then be converted to a probability using a standard algorithm given by equation (42) below.

$$p=(m^F/k)\chi^2(kf/m^F,k) \qquad (42)$$

where:

$$k=2(m^F/\sigma^F)^2 \qquad (43)$$

The resulting probability value can then be compared with a threshold to determine whether the area of the input image best satisfying the model satisfies the model sufficiently for it to be concluded that the determined area of the input image represents an instance of the class of images represented by the model.

Figure 10:
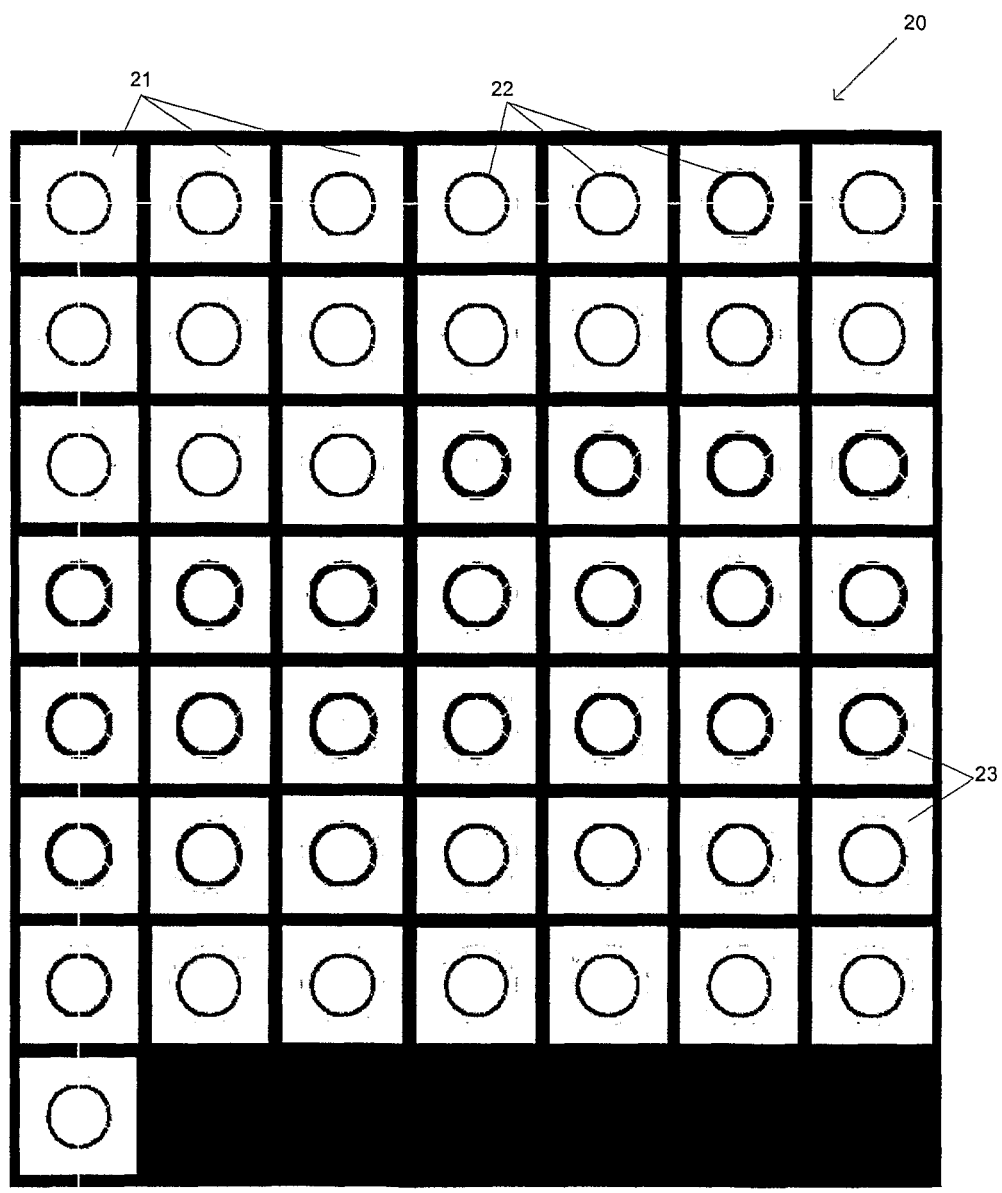
FIG. 10 is an illustration of a set of training images.

Referring now to FIG. 10, a training set of images 20 is shown, corresponding to the training images 2 of FIG. 1. Each of the white squares 21 is a training image. The image portion to be identified is a circle 22. Although the images are all similar, they are not identical and vary in detail. For example the thickness of the line defining the circle varies across the images. The training set of images 20 can be said to represent a range of variation that is acceptable.

Within each image of the training set of images 20, the region corresponding to the component to be identified (i.e. a circle) is selected as shown by a light grey box 23 in FIG. 10.

Figure 11:
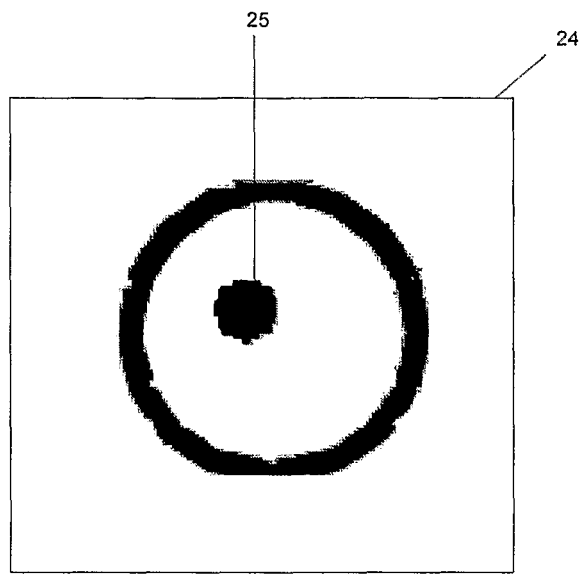
FIG. 11 is an illustration of an input image which is not in accordance with the set of training images.

The identified area of the training set of images 20 is converted to a set of training vectors. The set of training vectors is passed to the model building module 1 of FIG. 1 and a model 3 is constructed based upon the set of training vectors. FIG. 11 shows a test image 24 to be tested to determine if it is an acceptable image based upon the model generated from the training set of images 20. The area 25 of the test image 24 can be seen to differ from all of the training set of images. It is therefore desired that the image testing module 4 identifies the test image 24 as not acceptable based upon the training set 20.

When the processing described above is applied to a test vector generated from the test image 24, the resulting value of the fit function $f$ generates a probability value below the predetermined threshold, such that it is determined that the test image 24 does not satisfactorily satisfy the model. It was explained that the processing of FIG. 7 generates a vector of weights $w_y$, one weight being associated with each element of a processed test vector (i.e. one weight being associated with each pixel of a test image). Pixels having a low associated weights are those which deviate most from the model, and as such useful information can be provided to an operator indicating which area of the test image is responsible for the failure of the test image to satisfy the model.

Figure 12:
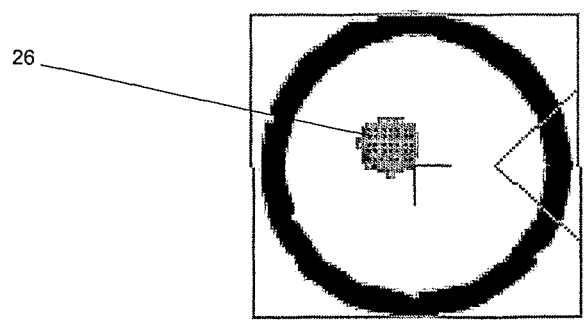
FIG. 12 is an illustration of output provided indicating defective pixels in a test image.

FIG. 12 shows output provided to an operator indicating that pixels 26 are highlighted as being those which deviate most from the model.

Although preferred embodiments of the invention have been described above it will be appreciated that various modifications can be made to the described embodiments without departing from the spirit and scope of the present invention as defined by the appended claims. In particular, this description is intended to be illustrative and not restrictive in character.

The invention claimed is:

1. A computer-implemented method of generating a model from a set of images, the method comprising:
processing a plurality of data items, each data item representing an image of said set of images, to determine variability between said plurality of data items;
generating model data representing said model based upon said data items and said variability, wherein the influence of each of said data items upon the generated model is determined by a relationship between a respective one of said data items and said variability.

2. A method according to claim 1, wherein each of said plurality of data items is a normalized data item.

3. A method according to claim 2, further comprising:
receiving a plurality of initial data items, each initial data item comprising a plurality of elements;
determining a median value for each element based upon values of that element in each of said plurality of initial data items.

4. A method according to claim 3, further comprising:
determining a median absolute deviation for each element based upon values of that element in each of said plurality of initial data items.

5. A method according to claim 4, further comprising:
processing each element of a respective initial data item with reference to a respective median value and median absolute deviation value to determine a normalization factor for the respective initial data item; and
generating a respective normalized data item by applying said normalization factor to the respective initial data item.

6. A method according to claim 1, wherein generating said model based upon said data items comprises associating a weight with each of said data items, said weights being based upon said variability.

7. A method according to claim 6, further comprising computing a weight for each of said data items.

8. A method according to claim 7, wherein computing a weight for a respective data item comprises determining a relationship between the respective data item and an average data item.

9. A method according to claim 8, wherein said average data item is a median data item.

10. A method according to claim 8, further comprising determining a value indicating a confidence in each of said data items.

11. A method according to claim 10, wherein the confidence of a respective data item is based upon the relationship between the respective data item and the average data item and variability of said data items.

12. A method according to claim 10, further comprising generating a probability distribution from said values indicating a confidence in each of said data items, and determining a probability value for each of said data items based upon the generated distribution.

13. A method according to claim 12, wherein the weight associated with a particular data item is a function of the determined probability value.

14. A method according to claim 13, wherein said function provides a first weight value when said probability is within a first range, and said function returns a weight value in a second range when said probability is in a second range.

15. A method according to claim 1, wherein said model is a statistical model.

16. A method according to claim 1, wherein each data item is a vector.

17. A method according to claim 1, wherein each element of each data item represents a pixel value.

18. A non-transitory computer readable storage medium carrying a computer program comprising computer readable instructions configured to cause a computer to carry out a method according to claim 1.

19. A non-transitory computer readable storage medium storing data representing a model created using the method of claim 1.

20. A computer apparatus for generating a model from a set of images, the computer apparatus comprising:
a memory storing processor readable instructions; and
a processor arranged to read and execute instructions stored in said memory;
wherein said processor readable instructions comprise instructions arranged to control the computer to carry out a method according to claim 1.

21. A computer-implemented method of generating a model from a set of images, the method comprising:
processing a plurality of data items, each data item representing an image of said set of images, to determine variability between said plurality of data items;
generating model data representing said model based upon said data items and said variability, wherein the influence of each of said data items upon the generated model is determined by a relationship between a respective one of said data items and said variability;

wherein generating said model comprises:
  associating a weight with each of said data items, said weights being based upon said variability;
  determining a difference relationship between each of said data items and an average data item to generate a plurality of difference data items;
  applying said weights to said difference data items; and
  generating a matrix indicating how each weighted difference data item varies with reference to each other weighted difference data item.

22. A method according to claim 21, wherein generating said model further comprises:
  performing eigensystem analysis on said matrix to generate a plurality of eigenvectors; and
  creating a matrix containing at least some of said plurality of eigenvectors.

23. A method according to claim 22, wherein generating said plurality of eigenvectors further comprises generating a plurality of eigenvalues, wherein said plurality of eigenvalues are generated by processing a further matrix, said further matrix being of smaller size than said matrix.

24. A computer-implemented method of generating a model from a set of images, the method comprising:
  processing a plurality of data items, each data item representing an image of said set of images, to determine variability between said plurality of data items;
  generating model data representing said model based upon said data items and said variability, wherein the influence of each of said data items upon the generated model is determined by a relationship between a respective one of said data items and said variability, wherein said model is a statistical model] having a form:

$m+Pb$ where m is an average data item;
  P is a matrix indicating permissible variation; and
  b is an example instance of the model.

25. A computer implemented method of generating data indicating how well an input image satisfies a model representing a set of images, the method comprising:
  processing an input data item representing the input image to generate data indicating how well the image can be represented by the model;
  wherein the input data item comprises a plurality of elements, each element representing a respective image element of the input image, and processing the input data item to determine how well the input image satisfies the model comprises:
  determining an influence which each element of the input data item should have upon the generated data, and generating said data such that each element of the input data item has the determined influence.

26. A method according to claim 25, wherein determining an influence which an element of the input data item should have upon the generated data comprises:
  generating a weight data item for each element of the input data item.

27. A method according to claim 26, wherein each of said weight data items is generated using iterative processing.

28. A method according to claim 25 further comprising generating output data indicating the influence of at least some of said input elements upon said determination, wherein said output data comprises graphical output data indicating pixels of the input image which contribute relatively little to the determination.

29. A method according to claim 25, wherein said data indicating how well an input image satisfies a model is generated iteratively.

30. A method according to claim 25, wherein the input data item is a normalized input data item.

31. A non-transitory computer readable storage medium carrying a computer program comprising computer readable instructions configured to cause a computer to carry out a method according to claim 25.

32. A computer implemented method of generating data indicating how well an input image satisfies a model representing a set of images, the method comprising:
  processing an input data item representing the input image to generate data indicating how well the image can be represented by the model;
  wherein the input data item comprises a plurality of elements, each element representing a respective image element of the input image, and processing the input data item to determine how well the input image satisfies the model comprises:
  determining an influence which each element of the input data item should have upon the generated data, and generating said data such that each element of the input data item has the determined influence,
  wherein generating said data such that each element has the determined influence comprises:
  determining a relationship between each element in a plurality of sample data items representing images of the set of images and a respective element of the input data item; and
  applying a respective one of said weight data items to each relationship to generate said data indicating how well the input image satisfies the model.

33. A computer implemented method of generating data indicating how well an input image satisfies a model representing a set of images, the method comprising:
  processing an input data item representing the input image to generate data indicating how well the image can be represented by the model;
  wherein the input data item comprises a plurality of elements, each element representing a respective image element of the input image, and processing the input data item to determine how well the input image satisfies the model comprises:
  determining an influence which each element of the input data item should have upon the generated data, and generating said data such that each element of the input data item has the determined influence, wherein determining an influence which an element of the input data item should have upon the generated data comprises:
  generating a weight data item for each element of the input data item,
  wherein generating each weight data item comprises determining a relationship between an element of the input data item and the variability of a respective element of a plurality of sample data items, wherein the relationship between an element of the input data item and the variability of an element of a plurality of sample data items is a relationship between the difference between the element of the input data item and an average element value, and said variability.

* * * * *